Feb. 23, 1954      M. G. BUELL      2,669,789

MEANS FOR DRILLING LANGUAGE PATTERNS

Filed Dec. 5, 1950

INVENTOR.
Maxine G. Buell
BY
Stanley Lightfoot
Attorney.

Patented Feb. 23, 1954

2,669,789

UNITED STATES PATENT OFFICE 2,669,789

MEANS FOR DRILLING LANGUAGE PATTERNS

Maxine G. Buell, Ann Arbor, Mich.

Application December 5, 1950, Serial No. 199,264

2 Claims. (Cl. 35—35)

The general object of the invention is to provide a simple arrangement of pictures suggesting action or situations in combination with means providing a language pattern for association with said pictures, whereby a student will be mentally stimulated to describe orally or in writing the action or situation of each picture by means of a sentence or of sentences employing the words of the language pattern (to which he supplies the names of the object displayed in the pictures), whereby the complete and correctly worded sentence to suit a suggested tense and situation, as well as to suit the variety of situations suggested by different pictures, is arrived at by the student.

A further object is to provide, in combination, a series of action or situation pictures, and a variety of language pattern means movable from one picture to another to assist the student in carrying the thought from picture to picture, applying a similar language pattern to each picture, whereby the correct usage of such pattern is progressively impressed on the mind of the student.

Further related objects, as well as advantages, will become apparent as the said invention is hereinafter further disclosed.

In carrying the said invention into effect, I may adopt a form of picture or work sheet together with language pattern or formula cards such as are shown, by way of example, on the accompanying drawing, wherein.

Figure 2:
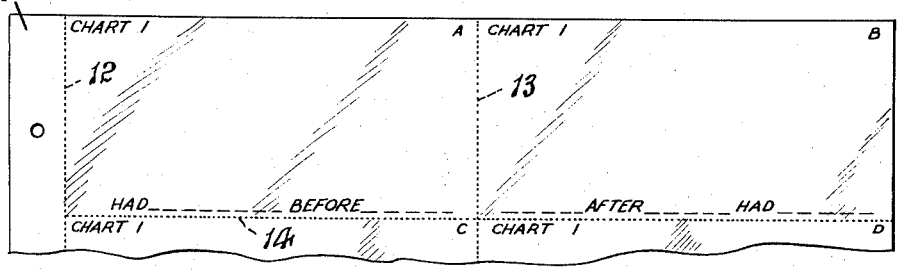
Figure 2 illustrates what may be regarded as the upper portion of a page of transparent material severably divided into rectangular portions, similar in size and shape to the picture portions of Figure 1, each of the said rectangular portions having a language pattern printed thereon for application to the picture portions of Figure 1 as hereinafter more fully described.
Figure 1:
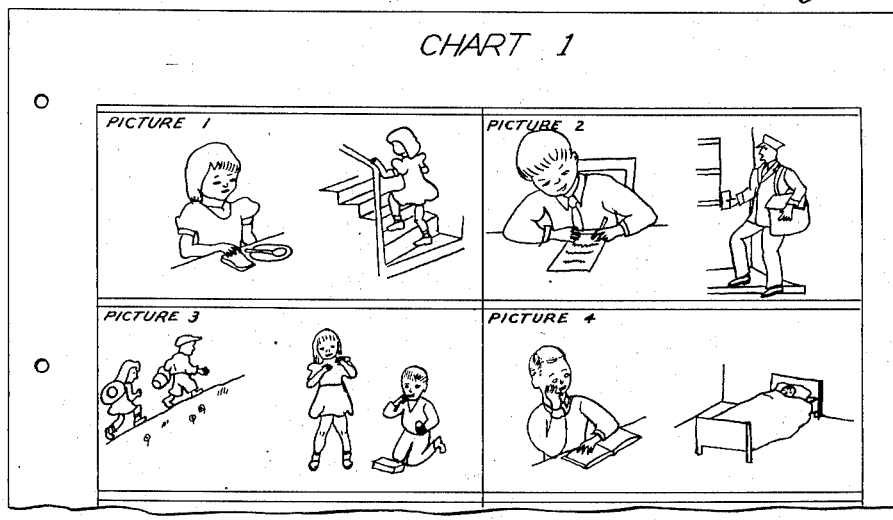
Figure 1 illustrates what may be regarded as the upper portion of a page of an exercise book displaying a series of pictures, each of which comprises two pictorial elements related to one another in matters of action and of time.
Figure 3:
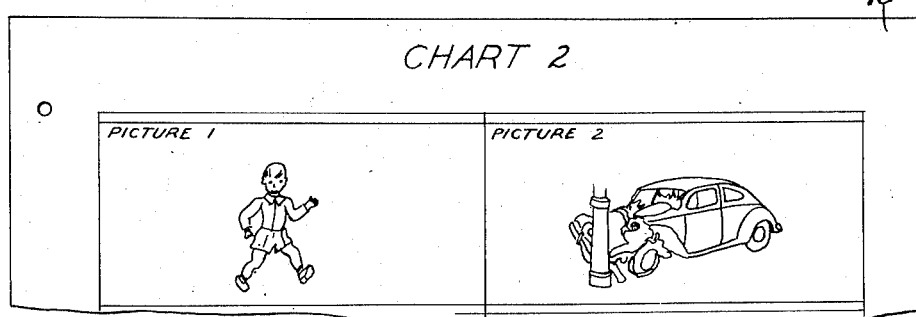
Figure 4:
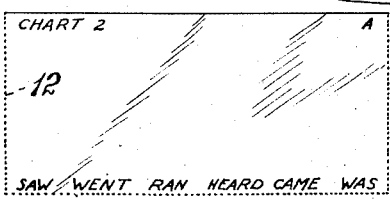

Figure 3 is a similar view to Figure 1 showing another form of picture arrangement in which there is a single depicted action in each picture, but wherein there is an action and time relationship between successive pictures; and Figure 4 illustrates a severed plastic rectangle, of the type shown in Figure 2, provided with another form of language pattern for application to the pictures of Figure 3.

Referring first to the examples, Figures 1 and 2: 10 indicates a sheet, or page, designated as "Chart 1" and exhibiting a succession of pictures designated as "Picture 1," "Picture 2," "Picture 3," and "Picture 4," each of which comprises two related picture elements. For instance, one element of Picture 1 shows a little girl in the act of eating and, in the second element, the same girl in the act of climbing a staircase. These may be considered as related acts in that the second element shows an action of the girl which takes place after she has eaten.

Similarly, in Picture 2, the first element depicts a boy writing a letter and the second element a mailman delivering the letter to some address, the second act naturally following the first.

In Picture 3, the first act shown is one of children climbing a hill and the second one of these children thereafter eating a picnic lunch; and in the fourth picture a boy is shown reading or studying his homework and later sleeping in bed.

It will be observed that the common characteristic of all of these pictures is that the same language pattern may be applied to each, in order to describe the picture-relationship between the two elements of the picture. Thus, a certain language pattern in all cases will be applicable to describe the action which takes place following that of the first element of the picture, and, similarly, a common language pattern may be applied to all of the pictures to describe the action which takes place before that of the second element of each picture.

To assist the student in carrying a language pattern from one to another thought or picture situation, in the series of the pictures of the chart, I propose to use a language pattern means in the form of cards or markers provided with key words, which words are to be used by the student in a sentence which is grammatically correct to describe the action or situation of each picture; and I prefer to construct these language pattern means of transparent material so that they may be laid over the pictures in succession whereby each picture together with the language pattern will be simultaneously viewed by the student.

By so applying one of these cards in succession to the series of pictures, the student is assisted in keeping in mind the pattern at all times, and the pattern is intended to be such that, when it is applied to a picture, it will stimulate the student in properly formulating the sentence describing the related action of the elements of the picture and carrying the thought process involved to the several pictures of the series, whereby correct usage of the language pattern is quickly and firmly impressed on the mind of the student.

A convenient form of these markers is shown in Figure 2, wherein a sheet 11 of flexible transparent material is perforated along lines 12, 13, and 14 for convenient separation of the markers (each of which is shown as being marked "Chart 1" to indicate that they are to be used with the chart of Figure 1), and the said markers are also separately marked "A," "B," "C," and "D," so that they may be readily referred to in selecting a particular language pattern to be practiced.

Each of the severable markers carries a different language pattern, but all language patterns are individually adapted to application to all of the series of the pictures on Chart 1.

The marker A of Figure 2 is shown as being provided with the language pattern "HAD . . . BEFORE . . . ," the blanks indicating the points at which the words drawn from the pictures on Chart 1 (Figure 1) are to be supplied by the student. For example, the student may place the marker A of Figure 2 over the Picture 1 of Chart 1 (where the marker is of transparent material) and, as suggested by the words on the marker, describe the picture in the sentence, "The child HAD eaten BEFORE she went upstairs." Then by moving the same marker to Picture 2, the sentence suggested would be "The boy HAD written a letter BEFORE the postman came." Application of the same marker to Picture 3 indicates "The children HAD climbed the hill BEFORE they ate their lunch," and applied to Picture 4 suggests "The boy HAD studied his homework BEFORE he went to bed."

It will be seen that the use of the marker assists the student in maintaining the language pattern in describing all of the pictures of Chart 1, so that the usage of that pattern quickly becomes a matter of habit with the student who may readily thereafter use the pattern freely in written and spoken language when describing similar situations or action.

The application of marker 2 of Figure 2 to the several pictures in the same manner, and for the same purpose, will be apparent. Other examples of language patterns may be "DID . . . AFTER . . . HAD . . .?" (DID Mary go upstairs AFTER she HAD eaten?); "HAD . . . BEFORE . . .?" (HAD she eaten BEFORE she went upstairs?); "WHAT DID . . . DO AFTER . . . HAD . . .?" (WHAT DID Mary DO AFTER she HAD eaten?); or "WHAT HAD . . . DONE BEFORE . . .?" (WHAT HAD Mary DONE BEFORE she went upstairs?).

In Figure 3; Chart 2 indicates a series of pictures, wherein the progressive action extends from one picture to the next, that is, Picture 2 shows an accident which may be considered to have happened while the boy, Picture 1, was walking down the street, and a type of marker is shown in Figure 4 on which a series of verbs are printed, any one or a combination of which may be used by the student in describing the relationship between pictures which are shown or other pictures of a progressive nature which may appear upon Chart 2. Thus, utilizing the marker of Figure 4 in association with the pictures of Chart 2 in the manner previously described, the student is stimulated to build such sentences as "The boy walked downtown. He HEARD a crash and SAW the car hit a post." and so forth.

It will be seen that, by the means described, the student is assisted in carrying the language to a variety of situations and properly applying it thereto, the context of the several pictures of each chart being chosen to suggest the same language forms which the child is required to formulate orally or in written form.

Further, the markers serve to assist the student in remembering the language pattern throughout its application to the entire series of pictures, and they also serve to represent for the student a material symbolization of the thought process involved in applying a given language pattern to a great variety of situtaions, whereby correct use of the language under such circumstances is quickly acquired, and becomes habitual.

This invention may be developed within the scope of the following claims without departing from the essential features of the said invention, and it is desired that the specification and drawing be read as being merely illustrative of a practical embodiment of the same and not in strictly limiting sense.

What I claim is:

1. Means for drilling language patterns, comprising a chart illustrating a series of two or more related pictures located adjacent one another, said related pictures together suggesting a complete thought which may be expressed in a sentence; a series of transparent markers each having printed thereon a plurality of words forming an incomplete sentence, said marker adapted to be placed over said related pictures so that a student may complete the sentence upon the marker to describe the thought suggested by the pictures; the incomplete sentence of any one of said markers being applicable to each of the series of related pictures.

2. Means for drilling language patterns, comprising a chart illustrating a series of pairs of related pictures, said related pictures together suggesting a complete action or situation which may be expressed in a sentence; a series of markers each having printed thereon a plurality of words forming an incomplete sentence in a predetermined language pattern which when completed by a student will describe the action or situation suggested by the related pictures when said marker is physically applied to said pictures as a means of reminding the student of the pattern to be used, the incomplete sentence of any one of said markers being applicable to each of said pairs of related pictures.

MAXINE G. BUELL.

References Cited in the file of this patent

UNITED STATES PATENTS

| Number | Name | Date |
| --- | --- | --- |
| 1,538,529 | Troidl | May 19, 1925 |
| 1,755,853 | Waring | Apr. 22, 1930 |
| 2,497,200 | Appel | Feb. 14, 1950 |

FOREIGN PATENTS

| Number | Country | Date |
| --- | --- | --- |
| 255,129 | Great Britain | July 12, 1926 |